(12) United States Patent
Lin et al.

(10) Patent No.: US 6,243,185 B1
(45) Date of Patent: Jun. 5, 2001

(54) REFLECTIVE/TRANSMISSIVE SCANNER WITH REMOVABLE SCANNING PLATFORM AND DOCKING PORT

(75) Inventors: Martin Lin, Taipei; Yi-Yi Ho, Taichung, both of (TW)

(73) Assignee: Acer Peripherals, Inc., Taoyuan (TW)

( * ) Notice: Subject to any disclaimer, the term of this patent is extended or adjusted under 35 U.S.C. 154(b) by 0 days.

(21) Appl. No.: 09/548,535

(22) Filed: Apr. 13, 2000

(30) Foreign Application Priority Data

Apr. 30, 1999 (TW) .............................. 088206848

(51) Int. Cl.⁷ .................................... G02B 26/08
(52) U.S. Cl. .......... 359/196; 358/474; 358/482; 358/483; 358/487; 358/494; 358/497; 250/234
(58) Field of Search ................... 359/196–226; 358/474, 482, 483, 487, 494, 497; 250/234–235, 208.1

(56) References Cited

U.S. PATENT DOCUMENTS 5,574,274 * 11/1996 Rubley et al. ................. 250/208.1

* cited by examiner

*Primary Examiner*—James Phan
(74) *Attorney, Agent, or Firm*—Ladas & Parry

(57) ABSTRACT

An optical scanner for retrieving digital images of opaque and transmissive objects. The scanner of the present invention includes a scanner body, a docking port, and a removable scanning platform. An object to be scanned is placed on the scanning platform, which is subsequently loaded into scanner body for scanning. Inside the scanner body, a sensor module, including a first light source and an image-retrieving device, is disposed above the docked scanning platform; a support frame, on which is disposed a second light source, is disposed below the docked scanning platform. A connecting rod engages the sensor module and the support frame, and a driving device synchronously moves the sensor module and the support frame along a longitudinal axis. In a first embodiment, the scanning platform can include an adhesive tape for adhering an opaque object to be scanned to the surface of the scanning platform. In a second embodiment, the scanning platform can include a platform body with a perforated lid, on which an opaque object to be scanned can be positioned, and a vacuum device disposed therein. In a third embodiment, the scanning platform can include a transparent plate disposed in surface of the scanning platform, on which a transmissive object to be scanned can be positioned.

7 Claims, 6 Drawing Sheets

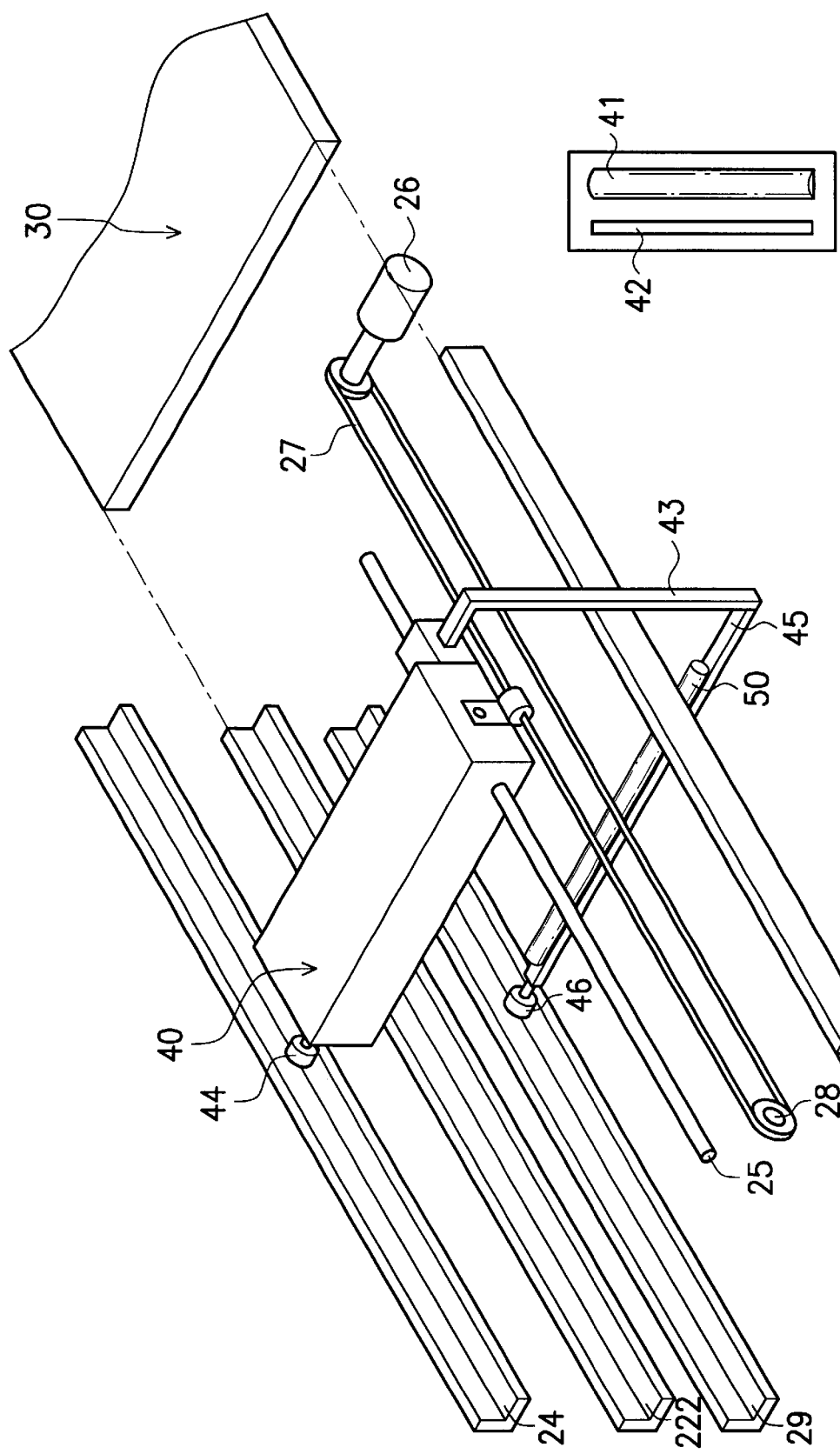

REFLECTIVE/TRANSMISSIVE SCANNER WITH REMOVABLE SCANNING PLATFORM AND DOCKING PORT

BACKGROUND OF THE INVENTION

1. Field of the Invention

The present invention relates to a reflective/transmissive scanner with a removable scanning platform and a docking port. More particularly, the present invention relates to a scanner which reduces the number of times that light must pass through a transparent plate during the scanning of an object, thereby improving the quality of the scanned image.

2. Description of the Related Art

Recent developments in the use of high speed, low cost digital electronic imaging systems to process, transmit and display digital information have substantially increased the demand for optical scanners to convert information into digital electronic form. A variety of optical scanners, including facsimile machines and digital copiers, have been developed to meet this growing demand. There are generally two types of scanners: reflective scanners for scanning opaque objects, such as documents and photographs; and transmissive scanners for scanning transmissive objects, such as slides and transparencies. Reflective scanners project light onto the surface of the object to be scanned. The light reflected from the opaque object is then received by an image-retrieving device which converts the image of the scanned object into an electronic signal. Transmissive scanners project light through the object to be scanned. The light passing through the transmissive object is then received by an image-retrieving device which converts the image of the scanned object into an electronic signal. The growing demand for both reflective and transmissive scanners has resulted in a need for scanners to provide both capabilities.

FIG. 1a illustrates the path of light during the scanning of an opaque object 1 positioned on the transparent plate 2. As illustrated by the arrows, light emitted from the light source 3 (typically located in the base of the scanner) passes through the transparent plate 2 and is reflected by the surface of reflective object 1, whereupon it passes back through the transparent plate 2 again and is then received by the image-retrieving device 4. In this example, light must pass through the transparent plate 2 twice. The physical properties of the transparent plate 2 can cause distortion of the light; therefore, the quality of the obtained image is degraded.

FIG. 1b illustrates the path of light during the scanning of a transmissive object 13 positioned on a transparent plate 14. As illustrated by the arrows, the light emitted from the light source 11 first passes through a transparent cover plate 12, then passes through the transmissive object 13 and the transparent plate 14 and finally be received by the image-retrieving device 15. Typically, the light source 11 is located in the lid of the scanner whereas the image-retrieving device 15 is located in the base of the scanner. The cover plate 12 can protect the light source 11 from dust or other damage. In this case, light must pass through both the cover plate 12 and the transparent plate 14. The physical properties of these two transparent plates can cause distortion of the light; therefore, the quality of the obtained image is degraded.

SUMMARY OF THE INVENTION

It is therefore an object of this invention to provide a scanner capable of scanning both opaque and transmissive objects. It is another object of this invention to provide a scanner in which light does not need to pass through a transparent plate during the scanning of an opaque object, thereby improving the quality of the scanned image. It is yet another object of the invention to provide a scanner in which light needs to pass through only one transparent plate during the scanning of a transmissive object, thereby improving the quality of the scanned image.

The present invention achieves the objects by providing an optical scanner for retrieving images of opaque and transmissive objects, comprising: a body defining a longitudinal axis; a docking port formed in a side surface of the body; a removable scanning platform on which a document to be scanned is placed, wherein the scanning platform is docked in the docking platform during scanning; a sensor module disposed within the body above the docked scanning platform and movable along the longitudinal axis; a first light source disposed on sensor module for providing light to scan an opaque object; an image-retrieving device disposed on the sensor module for retrieving digital images; a support frame disposed within the body below the docked scanning platform and movable along the longitudinal axis; a second light source disposed on the support frame for providing light to scan a transmissive object; a connecting rod engaging the sensor module to the support frame; and a driving device for synchronously moving the sensor module and the support frame along the longitudinal axis.

In a first embodiment of the present invention, a loading area of the scanning platform includes means for temporarily adhering an opaque object to be scanned to the surface of the scanning platform, for example an adhesive tape.

In a second embodiment of the present invention, the scanning platform comprises: a platform body; an upper lid disposed on the platform body with a perforated area for positioning an opaque object to be scanned; and a vacuum device disposed in the platform body and communicating outside the platform body; wherein the vacuum device creates a suction force through the perforations of the perforated area, thereby holding the object to be scanned to the scanning platform.

In a third embodiment of the present invention, a transparent plate is disposed in the surface of the scanning platform, on which a transmissive object to be scanned can be positioned.

In the case of scanning an opaque object, the object to be scanned is positioned on the scanning platform and the platform is docked in the docking port. During scanning, light from the first (reflective) light source does not pass through any transparent plates; therefore, the light is not distorted and the quality of the scanned image is improved. In the case of scanning a transmissive object, the object is positioned on the transparent plate disposed in the scanning platform and then the platform is docked in the docking port. During scanning, light from the second (transmissive) light source passes through only one transparent plate, compared with two in the prior art; therefore, the light is less distorted and the quality of the scanned image is improved.

BRIEF DESCRIPTION OF DRAWINGS

The following detailed description, given by way of examples and not intended to limit the invention to the embodiments described herein, will best be understood in conjunction with the accompanying drawings, in which:

FIGS. 3a and 3b are perspective views of the interior of the scanner of the present invention;

DETAILED DESCRIPTION OF THE INVENTION

Figure 1A:
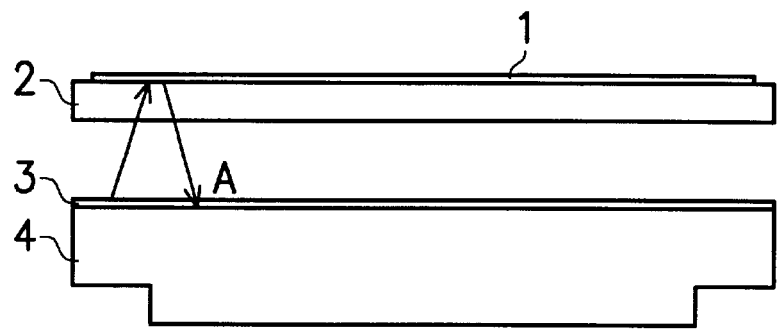
FIGS. 1a and 1b illustrate the path of light when scanning a reflective and a transmissive object with a scanner of the prior art.
Figure 1B:
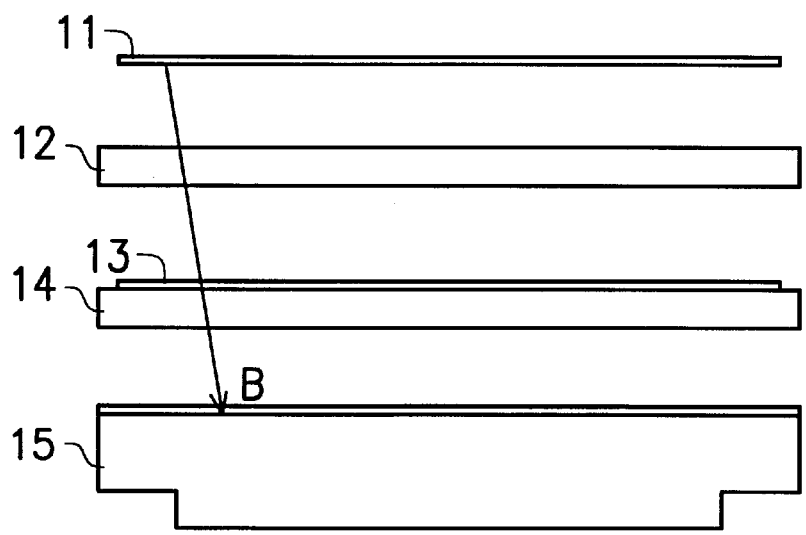
Figure 2:
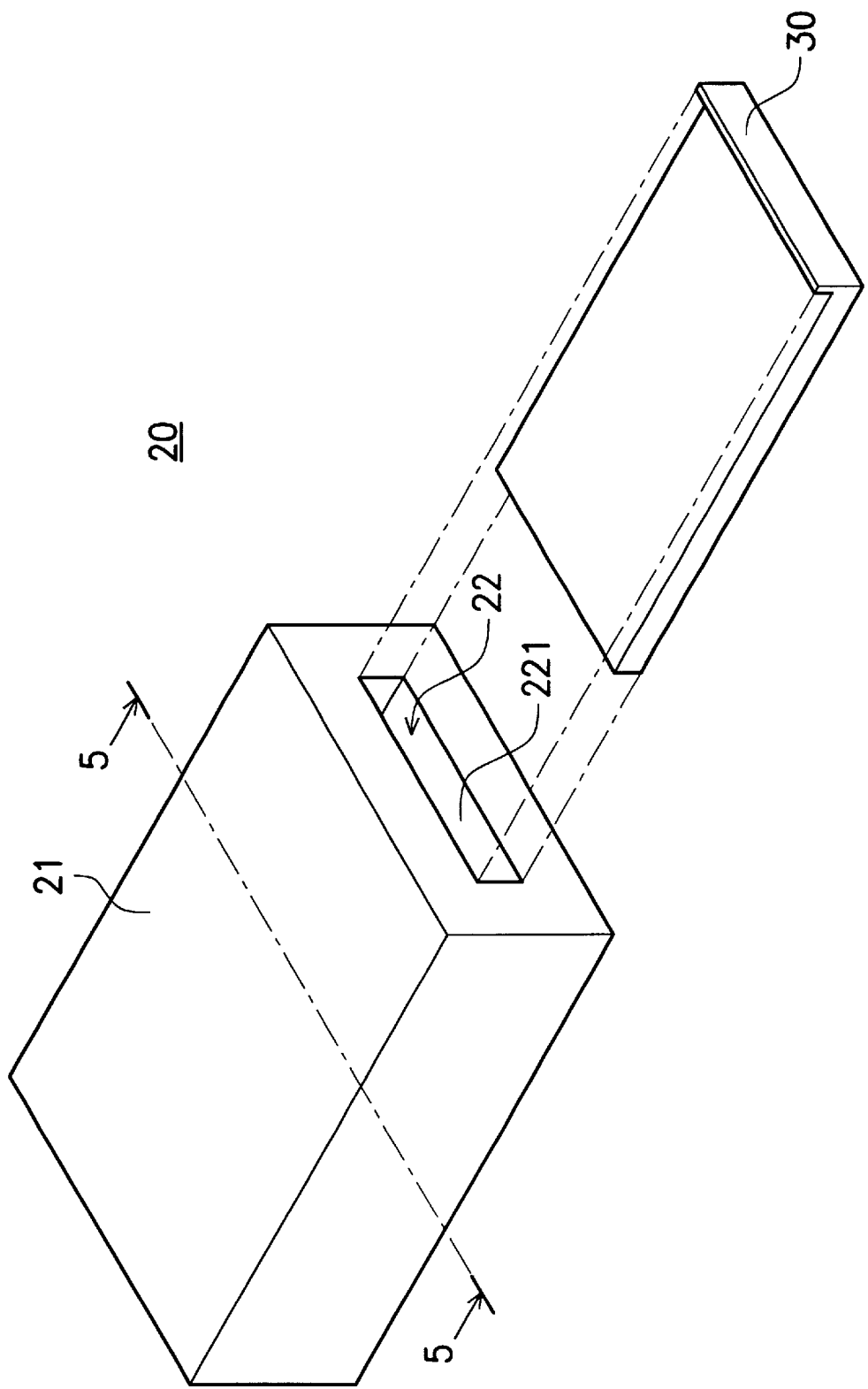
FIG. 2 is a perspective view of the scanner of the present invention.

Please refer to FIG. 2. An optical scanner for retrieving digital images of opaque and transmissive objects of the present invention includes a scanner body 21 with a docking port 22 formed in a side surface thereof, and a scanning platform 30. The docking port 22 comprises an opening 221, for receiving the scanning platform 30, and first guiding rails 222 (see FIG. 3a), for guiding the scanning platform to an appropriate position inside the scanner body 21.

As illustrated in FIG. 3a, the scanner of this invention further includes a sensor module 40, disposed above the docked scanning platform 30, and a support frame 45, disposed below the docked scanning platform 30. As illustrated in FIG. 3b, on the sensor module 40 are disposed a first light source 41 for scanning opaque objects and an image-retrieving device 42. The image-retrieving device 42 could be, for example, a Charged-Coupled Device (CCD). A second light source 50 for scanning transmissive objects is disposed on the support frame 45. The sensor module 40 and the support frame 45 are connected by a connecting rod 43. A driving device 26, for example a step motor, drives the sensor module 40 and the support frame 45 along a scanning path by means of belt 27 and pulley 28. The path of the sensor module 40 is guided by a guiding rod 25 and a first roller 44, which rolls along a second guiding rail 24. The path of the support frame 45 is guided by a second roller 46, which rolls along third guiding rail 29. The physical engagement between the sensor module 40 and the support frame 45 by the connecting rod 43 assures that the image-retrieving device 42 and the first and second light sources 41 and 50 are moved in a synchronous manner by the driving device 26.

Figure 4A:
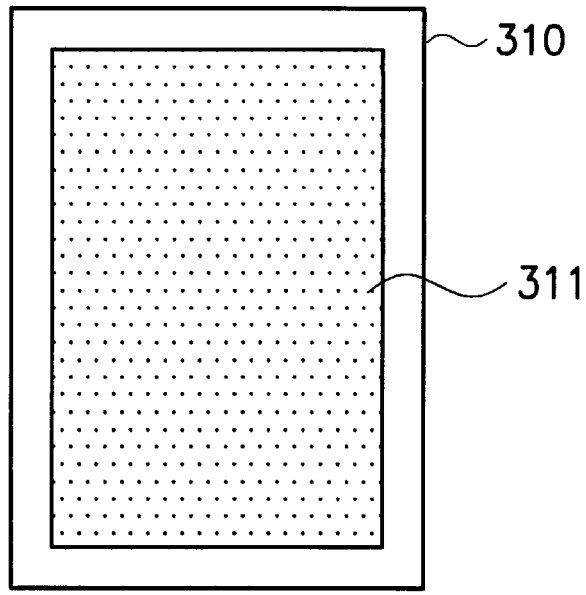
FIGS. 4a–4d are views of different embodiments of the scanning platform of the present invention.

Please refer to FIG. 4a. A first embodiment of the scanning platform 30 of the present invention will be described. In this embodiment, the upper surface 310 of the scanning platform 30 includes a loading area 311 for positioning an opaque object to be scanned. The loading area 311 comprises an adhesive tape for temporarily adhering the object to be scanned to the scanning platform 30. Thus, an object to be scanned can be temporarily fixed to the scanning platform 30 while the scanning platform is undocked (i.e., outside the scanner body 21), thereby insuring that the object will not move out of position when the scanning platform 30 is docked.

Figure 5A:
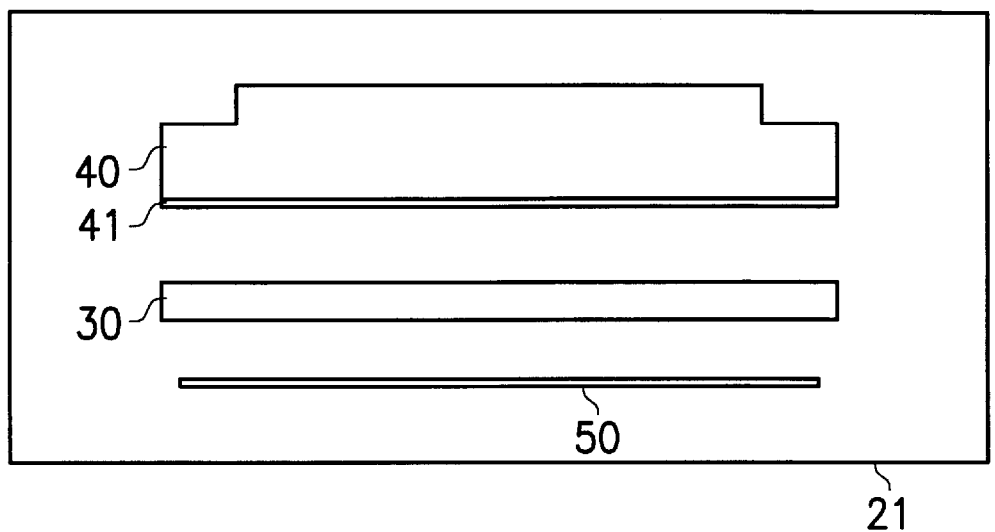
FIGS. 5a–5c illustrate the path of light when scanning a reflective and a transmissive object with the scanner of the present invention.
Figure 5B:
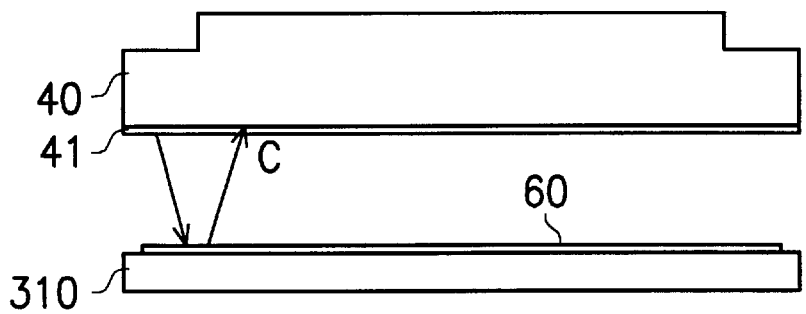

Refer to FIG. 5a. When the scanning platform 30 is docked in the docking port 22, the sensor module 40 can be driven by the driving device 26 along a scanning path. As illustrated by the arrows in FIG. 5b, light emitted from first light source 41 is reflected by the surface of the opaque object 60 positioned on the upper surface 310 of the scanning platform 30, and then is received by the sensor module 40. As indicated in the figure, the light does not need to pass through the transparent plate in this embodiment.

Figure 4D:
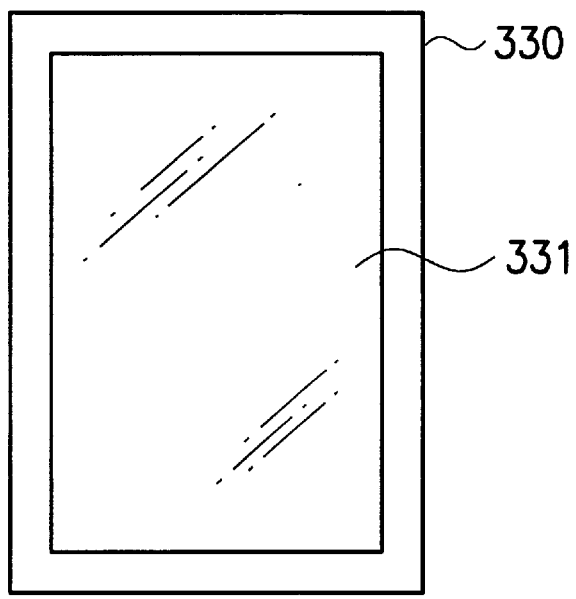
Figure 4B:
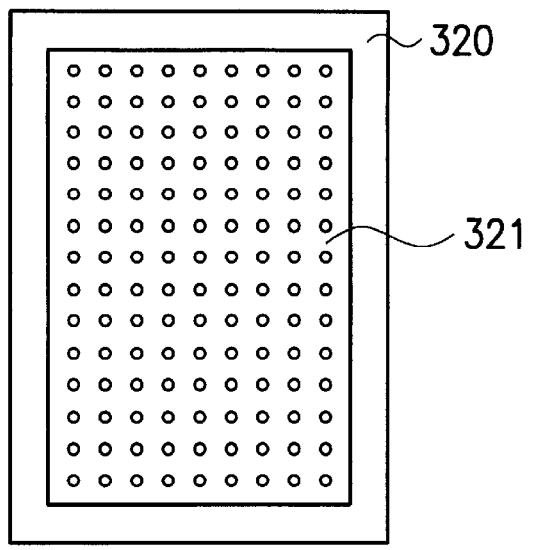
Figure 4C:
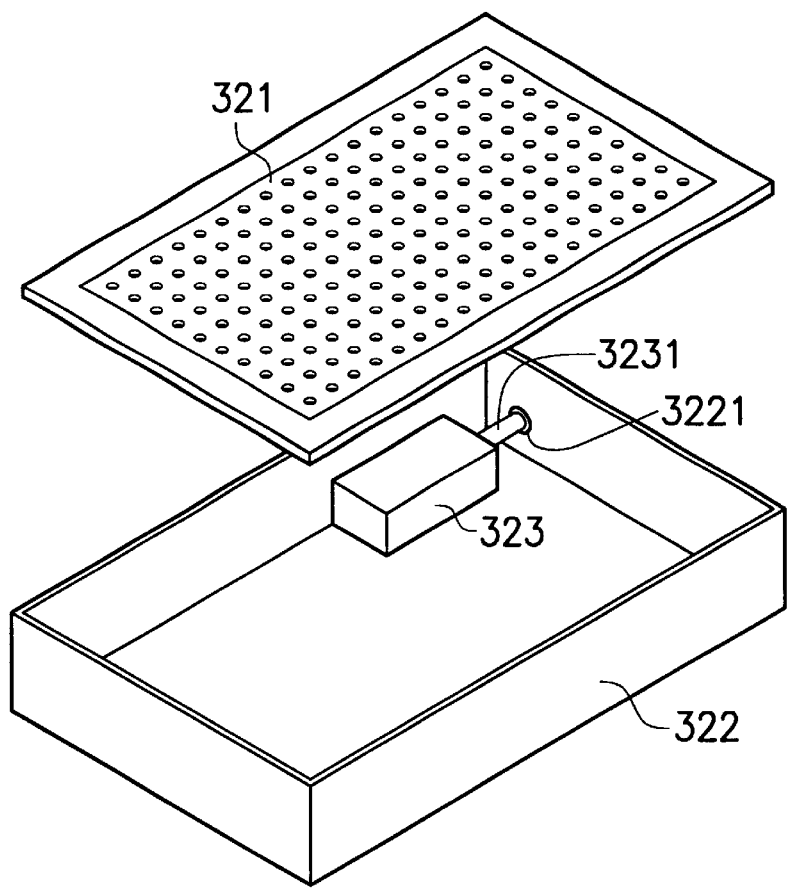

Referring to FIGS. 4b and 4c, a second embodiment of the scanning platform 30 of the present invention will be described. In this embodiment, the scanning platform 30 includes a platform body 322, in which is disposed a vacuum device 323 communicated with the exterior of the platform body by a pipe 3231 and a hole 3221. The upper surface 320 of the scanning platform 30 includes a perforated area 321 for positioning an opaque object to be scanned. When the vacuum device 323 is activated, a suction force through the perforations of perforated area 321 will be generated, thereby holding the object to be scanned to the scanning platform. Thus, the object to be scanned can be temporarily fixed to the scanning platform 30 while the scanning platform is undocked (i.e., outside the scanner body 21), thereby insuring that the object will not move out of position when the scanning platform 30 is docked.

As in the first embodiment, when the scanning platform 30 is docked in docking port 22 (FIG. 5a), the sensor module 40 can be driven by the driving device 26 along a scanning path. Light emitted from the first light source 41 is reflected by the surface of the opaque object positioned on the upper surface 320 of the scanning platform 30 and received again by the sensor module 40. Thus, the light does not need to pass through the transparent plate in this embodiment.

Referring to FIG. 4d, a third embodiment of the scanning platform 30 of the present invention will be described. In this embodiment, a transparent plate 331 for positioning a transmissive object to be scanned is disposed in the platform lid 330 of the scanning platform 30.

Figure 5C:
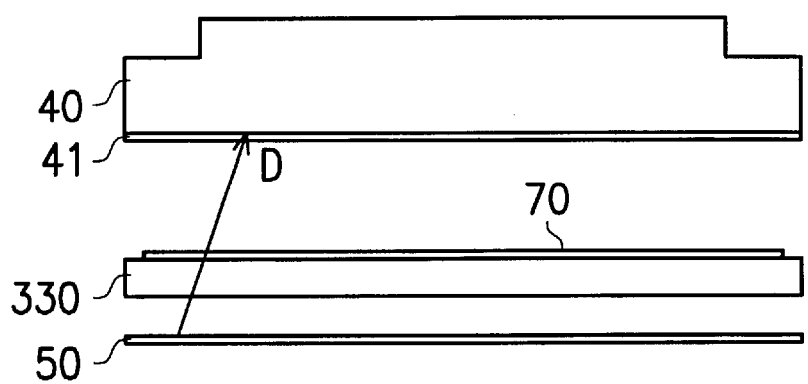

When the scanning platform 30 is docked in docking port 22 (FIG. 2), the sensor module 40 (FIG. 5a) and the support frame 45 (not shown) holding the second light source 50 can be synchronously driven by the driving device 26 along a scanning path. As illustrated by the arrows in FIG. 5c, light emitted from the second light source 50 first passes through the transparent plate disposed in the platform lid 330 of the scanning platform 30 and then passes through the transmissive object 70 to be received by the sensor module 40. As indicated in the figure, the light does not need to pass through only one transparent plate in this embodiment.

Therefore, in the first two embodiments of the present invention, light from the first light source does not pass through any transparent plates, compared with passing through a transparent plate twice in the prior art when reading the image of an opaque object; therefore, the light is not distorted and the quality of the scanned image is improved. In the third embodiment, light from the second light source passes through only one transparent plate, compared with two in the prior art when reading the image of a transmissive object; therefore, the light is less distorted and the quality of the scanned image is improved.

While the invention has been described with reference to various illustrative embodiments, the description is not intended to be construed in a limiting sense. Various modifications of the illustrative embodiments, as well as other embodiments of the invention, will be apparent to those person skilled in the art upon reference to this description. It is therefore contemplated that the appended claims will cover any such modifications or embodiments as may fall within the scope of the invention defined by the following claims and their equivalents.

What is claimed is:

1. An, optical scanner for retrieving digital images of opaque objects, comprising:
    a scanner body defining a longitudinal axis;
    a scanning platform formed in the upper surface of said scanner body for loading said opaque object;
    a sensor module positioned above said scanning platform, wherein said sensor module contacts with said opaque object directly when scanning, including:

a light source for providing light to scan;

an image-retrieving device for retrieving digital images;

a driving device for moving said sensor module along said longitudinal axis.

2. The optical scanner as claimed in claim 1, wherein said scanning platform comprises:

a platform body;

an upper lid disposed on said platform body with a perforated area for positioning an opaque object to be scanned; and a vacuum device disposed in said platform body wherein said vacuum device creates a suction force through the perforations of said perforated area, thereby holding the scanning object to the platform.

3. An optical scanner for retrieving digital images of opaque and transmissive objects, comprising:

a scanner body defining a longitudinal axis;

a docking port formed in a side surface of said body;

a removable scanning platform for scanning said opaque or transmissive objects, wherein said scanning platform is docked in said docking port during scanning;

a sensor module positioned above said docked scanning platform, including:

a first light source for providing light to scan said opaque object;

an image-retrieving device for retrieving digital images;

a second light source for providing light to scan said transmissive object;

a connection set for connecting said sensor module to said second light source; and a driving device for synchronously moving the sensor module and said second light source along the longitudinal axis.

4. The optical scanner as claimed in claim 3, wherein said connection set including:

a support frame disposed below the docked scanning platform and movable along said longitudinal axis;

a connecting rod engaging said sensor module to said support frame.

5. The optical scanner as claimed in claim 3, wherein a loading area on said scanning platform includes means for temporarily adhering said opaque object to the surface of the scanning platform.

6. The optical scanner as claimed in claim 5, wherein the adhering means is an adhesive tape.

7. The optical scanner as claimed in claim 3, wherein a transparent plate is disposed in the surface of said scanning platform, on which said transmissive object can be positioned.

* * * * *